United States Patent
Purcell

(10) Patent No.: US 6,460,065 B1
(45) Date of Patent: *Oct. 1, 2002

(54) CIRCUIT AND METHOD FOR PARTIAL PRODUCT BIT SHIFTING

(75) Inventor: Stephen C. Purcell, Mountain View, CA (US)

(73) Assignee: ATI International SRL, Christ Church (BB)

( * ) Notice: Subject to any disclaimer, the term of this patent is extended or adjusted under 35 U.S.C. 154(b) by 0 days.

This patent is subject to a terminal disclaimer.

(21) Appl. No.: 09/158,748

(22) Filed: Sep. 22, 1998

(51) Int. Cl.$^7$ .............................. G06F 7/58; G06F 7/52
(52) U.S. Cl. ........................................ 708/606; 708/625
(58) Field of Search ................................ 708/606, 620, 708/625, 626

(56) References Cited

U.S. PATENT DOCUMENTS

| | | | | |
|---|---|---|---|---|
| 3,610,906 A | * | 10/1971 | Stampler | ..................... 708/625 |
| 5,337,267 A | * | 8/1994 | Colavin | ..................... 708/606 |
| 5,629,885 A | * | 5/1997 | Pirson et al. | ............... 708/606 |
| 6,018,758 A | * | 1/2000 | Griesbach et al. | ........... 708/606 |

* cited by examiner

Primary Examiner—Chuong Dinh Ngo
(74) Attorney, Agent, or Firm—Vedder Price Kaufman & Kammholz

(57) ABSTRACT

A circuit for shifting the number of partial product bits per column in an adder tree is provided. A partial product bit is generated having a weight $2^{2k}$ that has a 1 value only if one input bit of weight $2^{(k-1)}$ has a 0 value while another input bit of weight $2^k$ has a 1 value. Another more significant partial product bit of weight $2^{(2k+1)}$ receives the same input bits and has a 1 value only if both of the input bits have a 1 value. In this manner, the number of partial product bits in the column of weight $2^{2k}$ is decreased by 1 while the number of bits is the column of weight $2^{(2k+1)}$ is increased by 1. Therefore, if the column of weight $2^{2k}$ had the greatest number of partial product bits of all columns, and if the column of weight $2^{(2k+1)}$ had at least two fewer bits than the column of weight $2^{2k}$, the total maximum number of bits for all the columns is reduced by 1.

6 Claims, 3 Drawing Sheets

130

CIRCUIT AND METHOD FOR PARTIAL PRODUCT BIT SHIFTING

CROSS-REFERENCE TO RELATED APPLICATIONS

This is related to Application Ser. No. 09/159,271, filed the same day herewith, and incorporated by reference in its entirety.

BACKGROUND OF THE INVENTION

There are many conventional multiplication circuits that perform squaring. Typically, these circuits include an array of partial product bit generators, each bit generator providing a bit of a partial product by comparing the appropriate bits of the multiplicand and multiplier.

Each partial product bit of a common weight is provided to a column adder corresponding to the common weight. The complexity of the adder tree for a given column depends on the number of bits that are added in that column. Typically, the more complex an adder tree, the larger and slower the column adder. Therefore, a circuit and method for reducing the number of bits corresponding to a given column adder are desired.

This reduction is particularly important for the column with the most partial product bits. In many conventional circuits, each column is standardized with a common tree structure that is designed to meet the requirements of the column with the most bits. In these cases, a reduction in the maximum bits per column reduces the complexity of the adder tree structure for every column. Therefore, a circuit and method for reducing the maximum bits added per column is desired.

SUMMARY OF THE INVENTION

In accordance with the present invention, a circuit reduces the number of partial product bits in a column. The circuit includes a partial product bit generator, corresponding to the column, that generates a partial product bit of weight $2^{2k}$ (k is an integer). This partial product bit has a 1 value only if an input bit of weight $2^{(k-i)}$ has a 0 value while another input bit of weight $2^k$ has a 1 value. The circuit includes another partial product bit generator that receives the same two input bits. The second partial product bit generator provides a partial product bit of weight $2^{2k+i}$, wherein the second partial product bit has a 1 value only if both of the input bits have a 1 value.

In accordance with the present invention, a method is provided in which a partial product bit of weight $2^{2k}$ is generated having a 1 value only if the input bit of weight $2^{(k-1)}$ has a 0 value while the input bit of weight $2^k$ has a 1 value. A partial product bit of weight $22^{k+1}$ is generated having a 1 value only if both of the input bits have a 1 value. Another method includes providing the partial product bit generators described above.

The present invention and its advantages and features will be more fully understood in light of the following detailed description and the claims.

DESCRIPTION OF THE INVENTION

Throughout the figures and description, like reference symbols indicate like elements unless otherwise noted.

Partial product bits in the conventional school book method of squaring are "mirrored". For example, in the following multiplication, the italicized partial product bits are vertically mirrored about the bolded partial product bits.

|  |  |
|---|---|
| 001110011010 | (922) |
| x001110011010 | (922) |
| 000000000000 | 0 |
| 00*1110011*0*1*0 | 1 |
| 000000000*0*00 | 2 |
| 001110011*0*10 | 3 |
| 0011100110*1*0 | 4 |
| 000000000*0*00 | 5 |
| 000000000*0*00 | 6 |
| 001110011*0*10 | 7 |
| 0011100110*1*0 | 8 |
| 001110011*0*10 | 9 |
| 000000000000 | a |
| +000000000000 | b |
| 00001100111110001010 0100 | (850, 084) |
| 22221111111111 |  |
| 32109876543210 9876543210 | (Column #) |

The bolded partial product bits (hereinafter, "the mirror bits") are generated by partial product bit generators that multiply a multiplicand bit of weight $2^k$ and a multiplier bit of the same weight, where k is the set of integers from 0 to n−1. The k'th bit from the right in the m'th partial product is referred to as "partial product bit mk" (or "bit mk"), where m is the set of integers from 0 to n−1. The partial product bits to the upper left and lower right of the mirrored bits are respectively referred to as "the upper bits" and "the lower bits". For each upper (or lower) bit mk, there exists exactly one corresponding lower (or upper) bit km of equal weight and magnitude.

Squaring may also be performed by deleting all of the lower bits ("right bits") and by shifting the upper bits 1 bit left as in the following example.

|  |  |
|---|---|
| 001110011010 | (922) |
| x001110011010 | (922) |
| 00000000000 0 | 0 |
| 0011100110 1 | 1 |
| 000000000 0 | 2 |
| 00111001 1 | 3 |
| 0011100 1 | 4 |
| 000000 0 | 5 |
| 00000 0 | 6 |
| 0011 1 | 7 |
| 001 1 | 8 |
| 00 1 | 9 |
| 0 0 | a |
| +0 | b |
| 00001100111110001010 0100 | (850, 084) |
| 22221111111111 |  |
| 32109876543210 9876543210 | (Column #) |

Each partial product bit generator that receives multiplicand bit k for the non-mirror bits receives a bit of weight $2^k$ and a bit of weight $2^m$ and generate a bit of weight $2^{(k+m+1)}$. When deleting all of the lower bits, m is an integer greater than 0.

In the above method, the number of product bits is reduced from $n^2$ (e.g., 144) in the conventional method to $n(n+1)/2$ (e.g., 78), a reduction of almost 50%. Furthermore, the maximum number of partial product bits per column is [(n/2)+1] truncated (e.g., 7 if n equals 12). Therefore, the maximum number of carry save adders required for a column is reduced from n−2 (e.g., 10) to [(n/2)−1] truncated (e.g., 5).

Figure 1:
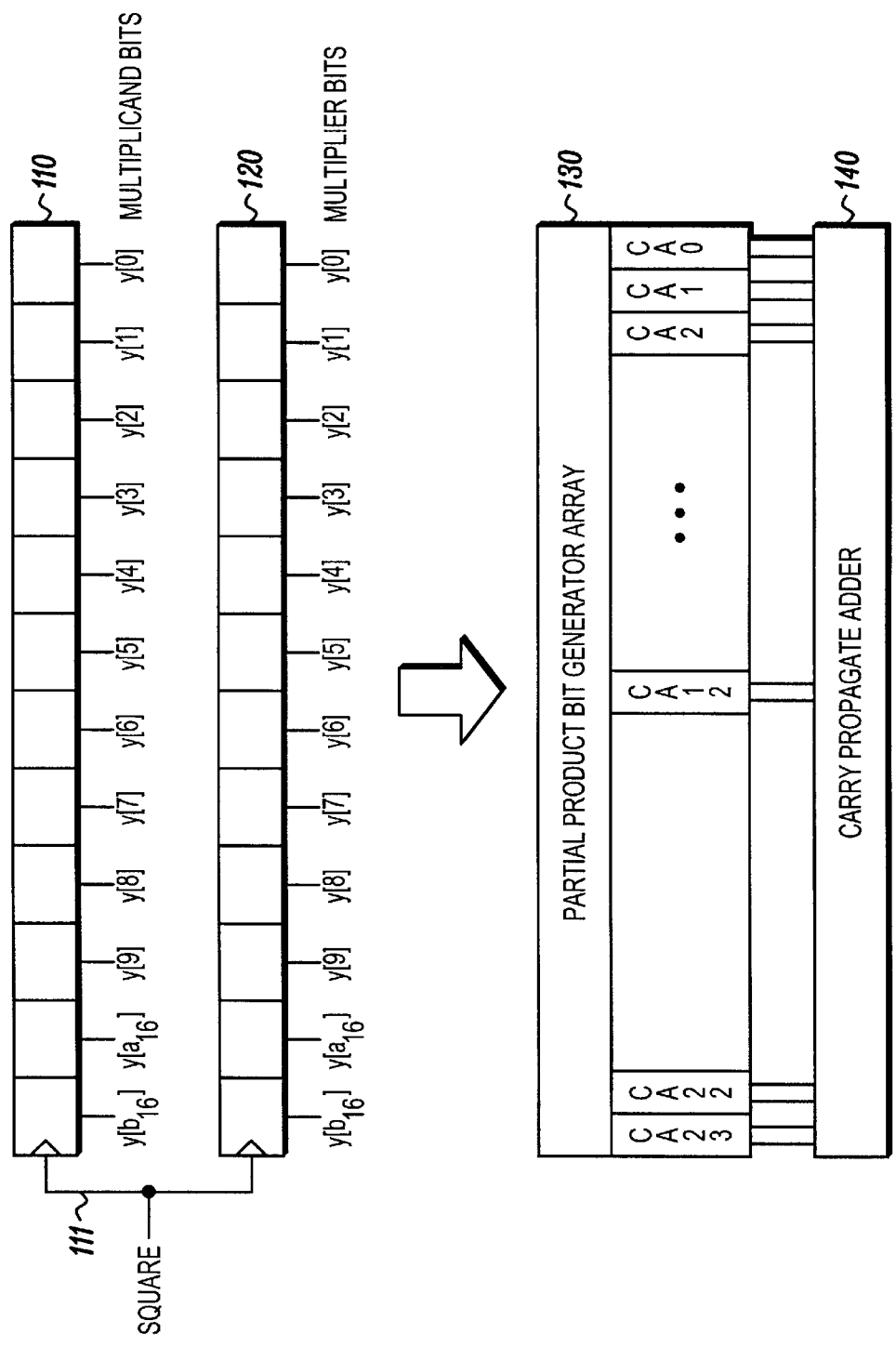
FIG. 1 shows a block diagram of a squaring circuit according to the present invention.

FIG. 1 shows a block diagram of a circuit that accomplishes the above described squaring. In FIG. 1, two 12-bit registers 110 and 120 are each configured to store the same 12-bit value $y[b_{16}:0]$ to be squared. Each bit $y[q]$ of the 12-bit value $y[b_{16}:0]$ has a weight $2^q$, where for q is the set of integers from 0 to $b_{16}$. Register 110 has lead lines corresponding to each bit $y[b_{16}:0]$ as does register 120. In one embodiment, only one register 110 is used to provide bits $y[b_{16}:0]$. In another embodiment, bits $y[b_{16}:0]$ are provided by a circuit (not shown) other than a register.

In response to a signal SQUARE on line 111, signals representing each bit of value $y[b_{16}:0]$ are provided to a partial product bit generator array 130 ("array 130"). Array 130 generates partial product bits and provides the partial product bits to a respective one of column adders CA0 to CA23 that corresponds to the weight of the partial product bit. The column adders CA0 to CA23 may provide the resulting square in redundant form (i.e., a carry and sum bit for each bit place), in which case the result is provided to a carry propagate adder 140.

Figure 2:
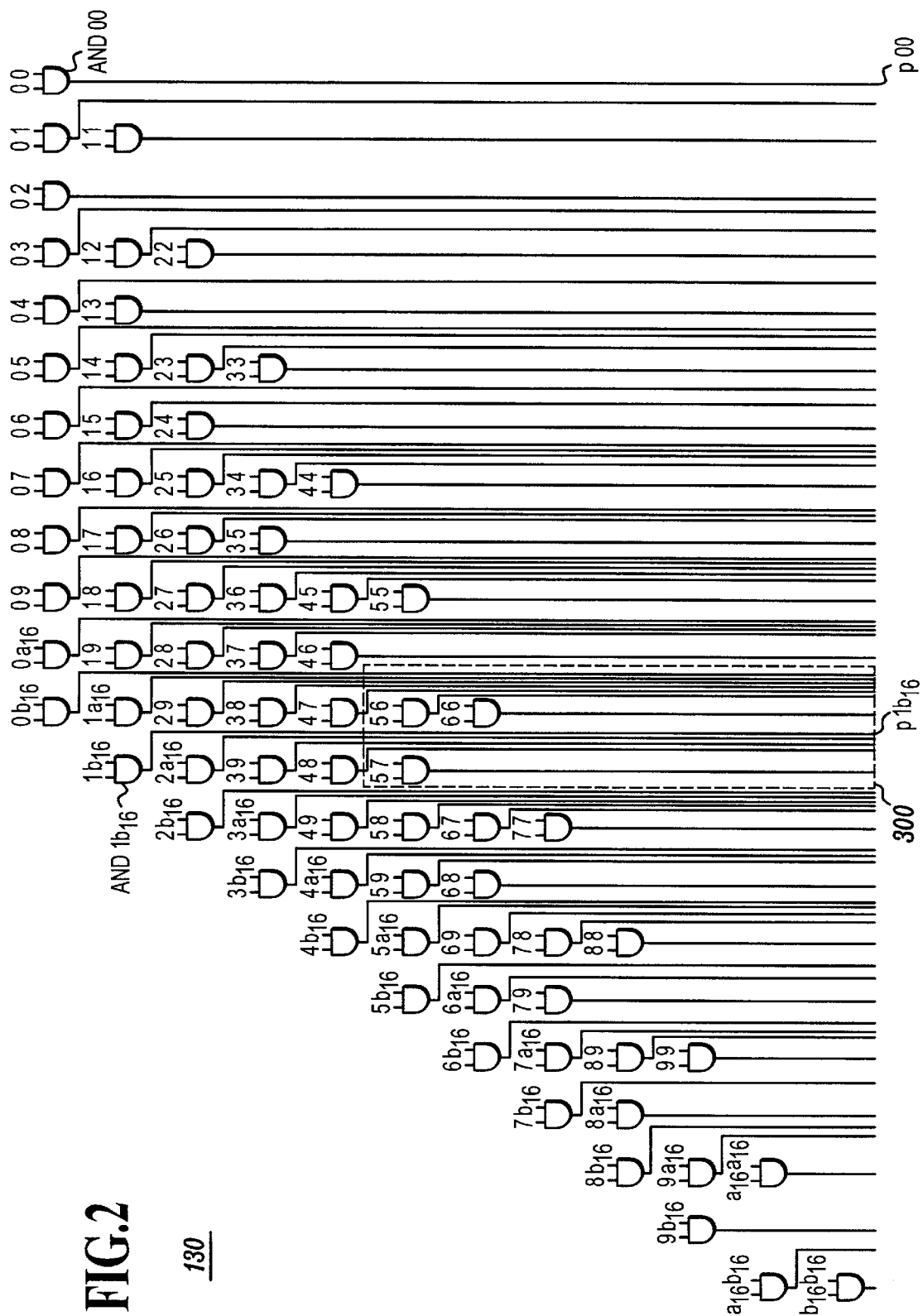
FIG. 2 is a detailed gate level diagram of one embodiment of the partial product bit generator array of FIG. 1.

FIG. 2 is a detailed gate level diagram of array 130 which may be, for example, an array of AND gates. Each AND gate mk (e.g., AND gate $1b_{16}$ in FIG. 2) has two numbers m and k (e.g., 1 and $b_{16}$) associated with its input terminals. The left number m (e.g., 1 for AND gate $1b_{16}$) indicates that one input terminal is configured to receive bit $y[m]$ (e.g., bit $y[1]$) from registers 110 or 120. The right number k (e.g., $b_{16}$ for AND gate $1b_{16}$) indicates that the other input terminal is configured to receive bit $y[k]$ (e.g., $y[b_{16}]$) from registers 110 or 120. Each AND gate mk receives bits $y[m]$ and $y[k]$ on its input terminal and provides bit mk on its output terminal. For example, AND gate $1b_{16}$ receives bits $y[1]$ and $y[b_{16}]$ and generates partial product bit $1b_{16}$. Likewise, AND gate 00 receives bit $y[0]$ and provides partial product bit 00. The other AND gates and partial product bits are not labeled in FIG. 2 for clarity.

The column adders of FIG. 1 receive and add the partial product bits mk according to the following Table 1.

TABLE 1

| Column Adder | Partial product bits received | # of partial products |
|---|---|---|
| CA0 | 00 | 1 |
| CA1 | none | 0 |
| CA2 | 01, 11 | 2 |
| CA3 | 02 | 1 |
| CA4 | 03, 12, 22 | 3 |
| CA5 | 04, 13 | 2 |
| CA6 | 05, 14, 23, 33 | 4 |
| CA7 | 06, 15, 24 | 3 |
| CA8 | 07, 16, 25, 34, 44 | 5 |
| CA9 | 08, 17, 26, 35 | 4 |
| CA10 | 09, 18, 27, 36, 45, 55 | 6 |
| CA11 | $0a_{16}$, 19, 28, 37, 46 | 5 |
| CA12 | $0b_{16}$, $1a_{16}$, 29, 38, 47, 56, 66 | 7 |
| CA13 | $1b_{16}$, $2a_{16}$, 39, 48, 57 | 5 |
| CA14 | $2b_{16}$, $3a_{16}$, 49, 58, 67, 77 | 6 |
| CA15 | $3b_{16}$, $4a_{16}$, 59, 68 | 4 |
| CA16 | $4b_{16}$, $5a_{16}$, 69, 78, 88 | 5 |
| CA17 | $5b_{16}$, $6a_{16}$, 79 | 3 |
| CA18 | $6b_{16}$, $7a_{16}$, 89, 99 | 4 |
| CA19 | $7b_{16}$, $8a_{16}$ | 2 |
| CA20 | $8b_{16}$, $9a_{16}$, $a_{16}a_{16}$ | 3 |
| CA21 | $9b_{16}$ | 1 |
| CA22 | $a_{16}b_{16}$, $b_{16}b_{16}$ | 2 |
| CA23 | none | 0 |

Each column adder CA0 to CA23 receives the partial product bits as shown in Table 1 (plus carry in bits from the column to the right), and generates a sum and carry bit to be added by carry propagate adder 140 (FIG. 1) (and generates carry out bits to the column to the left).

As shown in Table 1, the maximum number of partial product bits received by any column adder is 7 received by column adder CA12. The maximum required number of 3:2 carry save adders needed to reduce the 7 partial product bits to a sum and carry value is only 5. Therefore, the above describes a circuit and method for squaring which reduces the number of required partial product bit generators by almost 50% compared to the prior art. This simplifies the adder tree and reduces the area of the adder tree needed to add the reduced number of partial product bits. Therefore, the above describes a squaring circuit that is faster and smaller than in conventional squaring.

In one embodiment, AND gates 00, 11, 22, 33, 44, 55, 66, 77, 88, 99, $a_{16}a_{16}$ and $b_{16}b_{16}$ are not used to generate respective partial product bits 00, 11, 22, 33, 44, 55, 66, 77, 88, 99, $a_{16}a_{16}$ and $b_{16}b_{16}$. Instead, bits $y[0]$, $y[1]$, $y[2]$, $y[3]$, $y[4]$, $y[5]$, $y[6]$, $y[7]$, $y[8]$, $y[9]$, $y[a_{16}]$ and $y[b_{16}]$ are provided unaltered as respective partial product bits 00, 11, 22, 33, 44, 55, 66, 77, 88, 99, $a_{16}a_{16}$ and $b_{16}b_{16}$. In this embodiment, the number of AND gates required to square is further reduced by n. For example, in squaring an n-bit value, the number of required AND gates is a mere n(n−1)/2 which equals 66 for a 12-bit value, a reduction by over ½ compared to the conventional circuit.

The maximum number of partial product bits per column may be reduced from [(n/2)+1] truncated (e.g., 7) to (n/2) truncated (e.g., 6) as is described hereafter. The reduction is accomplished by shifting one partial product bit from the column with the most partial product bits (e.g., column 12) to its more significant neighbor (e.g., column 13). The reduction is described with reference to FIG. 3A and FIG. 3B.

Figure 3A:
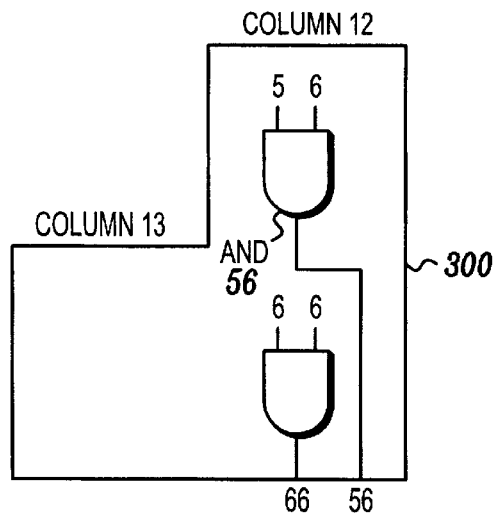
FIG. 3A shows a portion of the partial product bit generator array of FIG. 2.
Figure 3B:
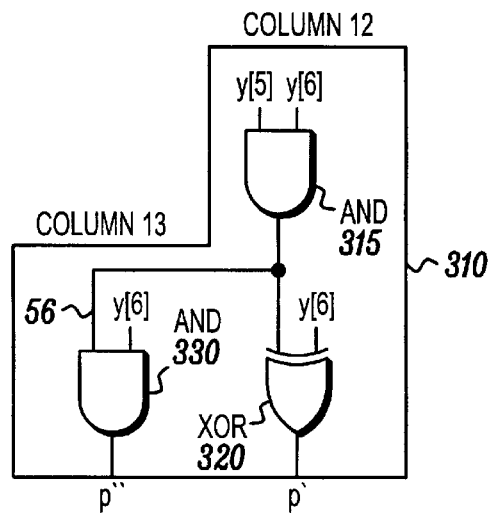
FIG. 3B shows a portion that replaces the portion of FIG. 3A.

FIG. 3A shows a portion 300 of array 130 that includes only AND gates 56 and 66. In portion 300, column 12 generates two partial product bits 56 and 66, while column 13 generates none. In FIG. 3B, portion 300 is replaced with a portion 310 in which column 12 generates only one partial product bit p', while column 13 also generates a partial product bit p". Although the total number of partial product bits does not change by replacing portion 300 with 310, the number of partial product bits generated by column 12 of the partial product bit generator array 130 is reduced from 7 to 6. The number of partial product bits generated by column 13 is increased from 5 to only 6. The maximum number of partial product bits generated by any one column of array 130 is thus reduced by 1 to 6. Thus, the maximum number of 3:2 carry save adders required per column is reduced to 4 for squaring a 12-bit value.

The following truth table (Table 2) shows the relationship between portion 310 input bits y[5] and y[6] and output partial product bits p' and p".

TABLE 2

| Input Bits | | bit | Output Bits | |
|---|---|---|---|---|
| y[5] | y[6] | 56 | p" | p' |
| X | 0 | 0 | 0 | 0 |
| 0 | 1 | 0 | 0 | 1 |
| 1 | 1 | 1 | 1 | 0 |

"X" means that the output bits p' and p" are not dependent on bit y[5] if bit y[6] is 0. Bit p' has a 1 value only if bit y[5] has a 0 value and bit y[6] has a 1 value. Bit p" has a 1 value only if both of bits y[5] and y[6] have a 1 value.

FIG. 3B shows a circuit (portion 310) that implements truth Table 2. An AND gate 315 logically AND's bits y[5] and y[6] to generate bit 56. Another AND gate 330 logically AND's bits 56 and y[6] to generate bit p". An XOR gate 320 logically XOR's bits 56 and y[6] to generate partial product bit p'.

Figure 3C:
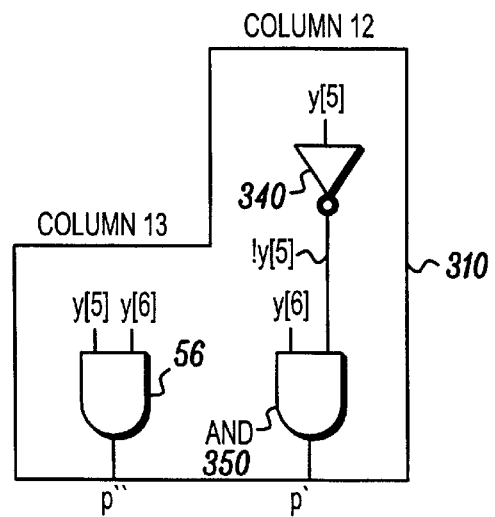
FIG. 3C shows an alternative embodiment of the portion of FIG. 3B.

An alternative embodiment of portion 310 is shown in FIG. 3C. AND gate 56 logically AND's bit y[5] and y[6] to generate partial product bit p". An inverter 340 inverts bit y[5] to generate bit !y[5]. An AND gate 350 logically AND's bits !y[5] and y[6] to generate bit p'.

The above embodiments reduce the required number of partial product bit generators required to square. Furthermore, the required tree structure for adding the partial product bits is simplified. Therefore, what is provided is a faster squaring circuit and method that requires less space than conventionally known.

Although the principles of the present invention are described with reference to specific embodiments, these embodiments are illustrative only and not limiting. Many other applications and embodiments of the principles of the present invention will be apparent in light of this disclosure and the claims set forth below.

For example, although the lower bits are described above as being deleted while the upper bits are shifted left, the upper bits may be deleted while the lower bits are shifted left one bit as shown in the following example.

```
              001110011010         (922)
            x 001110011010         (922)

000  0         0
                       0  1         1
                    0  00           2
                  1  110            3
                0  1010             4
              0  00000              5
            0  000000               6
          1  1011010                7
        1  10011010                 8
      0  110011010                  9
    0  0000000000                   a
  +00000000000                      b
  000011001111100010100100      (850, 084)
  22221111111111
  3210987654321098765432110     (Column #)
```

For clarity, the most significant bit of the lower bits for each partial product is represented above a corresponding mirror bit of equal weight. Here, where only the upper bits are deleted, the partial product bit generators (corresponding to multiplicand bit k) for the non-mirror bits each receive a bit of weight $2^k$ and a bit of weight $2^m$ and generate a bit of weight $2^{(k+m+1)}$, where m an integer is less than k.

Alternatively, a combination of upper and lower bits may be deleted so that there are no upper (or lower) bits that has a corresponding lower (or upper) bit. The remaining partial product bits are shifted left 1 bit.

```
              001110011010         (922)
            x 001110011010         (922)

00  00  00  0         0
                00  10  10  1       1
             0  00  00  0           2
                11  01  1  0        3
             01  00  1  10          4
              00  00  0  00         5
            0  00  0  00            6
                11  1  11  0        7
             01  1  01  10          8
              00  1  00  01         9
            0  0  00  00            a
          +0  00  00  0             b
  000011001111100010100100      (850, 084)
  22221111111111
  3210987654321098765432110     (Column #)
```

In this example, the following partial product bits mk are deleted: 03, 04, 07, 08, $0a_{16}$, $0b_{16}$, 10, 14, 15, 18, 19, $1b_{16}$, 20, 21, 25, 26, 29, $2a_{16}$, 31, 32, 36, 37, $3a_{16}$, $3b_{16}$, 42, 43, 47, 48, $4b_{16}$, 50, 53, 54, 58, 59, 60, 61, 64, 65, 69, $6a_{16}$, 71, 72, 75, 76, $7a_{16}$, $7b_{16}$, 82, 83, 86, 87, $8b_{16}$, 90, 93, 94, 97, 98, $a_{16}0$, $a_{16}1$, $a_{16}4$, $a_{16}5$, $a_{16}8$, $a_{16}9$, $b_{16}1$, $b_{16}2$, $b_{16}5$, $b_{16}6$, $b_{16}9$ and $b_{16}a_{16}$. The other bits mk are shifted left 1 bit. Here, the partial product bit generators for the non-mirror bits each receive a bit of weight $2^k$ and a bit of weight $2^m$ and generate a bit of weight $2^{k+m+1}$, where m is an integer not equal to k.

The above describes a squaring circuit in which there are no bits mk that have a corresponding bit km. However, the advantages of the present invention may be obtained, although to a lesser extent, by only shifting left a single bit (e.g., bit $1b_{16}$) and deleting the corresponding bit (e.g., bit $b_{16}1$) as in the following example.

```
              001110011010         (922)
            x 001110011010         (922)

000000000000          0
            0  01110011010          1
              000000000000          2
              001110011010          3
            001110011010            4
          000000000000              5
        000000000000                6
      001110011010                  7
    001110011010                    8
    001110011010                    9
    000000000000                    a
  +0000000000  0                    b
  000011001111100010100100      (850, 084)
  22221111111111
  3210987654321098765432110     (Column #)
```

The above described embodiments are illustrative only. Many other embodiments and variations will be apparent in light of this disclosure. The invention is defined by the following claims.

I claim:

1. A circuit for generating partial product bits in a squaring circuit for a binary number, receiving a first bit of weight $2^{(k-1)}$ and a second bit of weight $2^k$ of said binary number, comprising:

a first partial product bit generator configured to generate a first partial product bit of weight $2^{2k}$ such that the first partial product bit has a 1 value only if the first bit of weight $2^{(k-1)}$ has a 0 value while the second bit of weight $2^k$ has the 1 value, the first partial product bit generator comprises:

a first AND gate configured to receive and logically AND the first bit of weight $2^{(k-1)}$ and the second bit of weight $2^k$ to generate an intermediate bit; and an XOR gate configured to receive and logically XOR the intermediate bit and the second bit of weight $2^k$ to generate the first partial product bit of weight $2^{2k}$; and a second partial product bit generator configured to receive the intermediate and second bits and configured to provide a second partial product bit of weight $2^{2k+1}$ such that the second partial product bit has the 1 value only if the first bit of weight $2^{(k-1)}$ and the second bit of weight $2^k$ both have the 1 value.

2. The circuit of claim 1, wherein the second partial product bit generator comprises:

a second AND gate configured to receive the intermediate bit and the second bit of weight $2^k$ to generate the second partial product bit of weight $2^{(2k+1)}$.

3. The method for generating partial product bits in computing a square of a binary number, comprising:

receiving a first bit of weight $2_{(k-1)}$ and a second bit of weight $2^k$ of said binary number;

generating a first partial product bit of weight $2^{2k}$ with a first partial product bit generator, wherein the first partial product bit has a 1 value only if the first bit of weight $2^{(k-1)}$ has a 0 value while the second bit of weight $2^k$ has the 1 value, the generating the first partial product bit comprises:

logically AND'ing the first and second bits in a first AND gate to generate an intermediate bit;

logically XOR'ing the intermediate bit and the second bit in an XOR gate; and generating a second partial product bit of weight $2^{2k+1}$ with a second partial product bit generator configured to receive the intermediate and second bits, wherein the second partial product bit has the 1 value only if the first bit of weight $2^{(k-1)}$ and the second bit of weight $2^k$ both have the 1 value.

4. The method of claim 3, wherein generating the second partial product bit comprises:

logically AND'ing the intermediate bit and the second bit in a second AND gate.

5. A circuit for generating partial product bits in a squaring circuit for a binary number, receiving a first bit of weight $2^{(k-1)}$ and a second bit of weight $2^k$ of said binary number, comprising:

a first partial product bit generator configured to generate a first partial product bit of weight $2^{2k}$, the first partial product bit generator comprising:

a first AND gate configured to receive and logically AND the first bit of weight $2^{(k-1)}$ and the second bit of weight $2^k$ to generate an intermediate bit; and an XOR gate configured to receive and logically XOR the intermediate bit and the second bit of weight $2^k$ to generate the first partial product bit of weight $2^{2k}$; and a second partial product bit generator configured to receive the intermediate and second bits and configured to provide a second partial product bit of weight $2^{2k+1}$ such that the second partial product bit has the 1 value only if the first bit of weight $2^{(k-1)}$ and the second bit of weight $2^k$ both have the 1 value, wherein the first and second partial product bit generators reduce a number of partial product bits of weight $2^k$ and increase a number of partial product bits of weight $2^{2k+1}$.

6. A method for generating partial product bits in computing a square of a binary number, comprising:

receiving a first bit of weight $2^{(k-1)}$ and a second bit of weight $2^k$ of said binary number;

generating a first partial product bit of weight $2^{2k}$ with a first partial product bit generator, wherein the first partial product bit has a 1 value only if the first bit of weight $2^{(k-1)}$ has a 0 value while the second bit of weight $2^k$ has the 1 value, the generating the first partial product bit comprises:

logically AND'ing the first and second bits in a first AND gate to generate an intermediate bit;

logically XOR'ing the intermediate bit and the second bit in an XOR gate; and generating a second partial product bit of weight $2^{2k+1}$ with a second partial product bit generator configured to receive the intermediate and second bits, wherein the second partial product bit has the 1 value only if the first bit of weight $2^{(k-1)}$ and the second bit of weight $2^k$ both have the 1 value, wherein a number of partial product bits of weight $2^{2k}$ is decreased and a number of partial product bits of weight $2^{2k+1}$ is increased.

* * * * *